(12) United States Patent
Qi et al.

(10) Patent No.: US 8,691,329 B2
(45) Date of Patent: Apr. 8, 2014

(54) LASER NET SHAPE MANUFACTURING USING AN ADAPTIVE TOOLPATH DEPOSITION METHOD

(75) Inventors: Huan Qi, Niskayuna, NY (US); Prabhjot Singh, Guilderland, NY (US); Magdi Naim Azer, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 1265 days.

(21) Appl. No.: 11/669,518

(22) Filed: Jan. 31, 2007

(65) Prior Publication Data

US 2008/0178994 A1 Jul. 31, 2008

(51) Int. Cl.
*B05C 13/00* (2006.01)
*B05D 3/00* (2006.01)
*B05D 3/06* (2006.01)
*C08J 7/18* (2006.01)

(52) U.S. Cl.
USPC ........... 427/142; 427/140; 427/551; 427/553; 427/554; 427/555; 427/552

(58) Field of Classification Search
USPC .......... 427/140, 142, 551, 552, 553, 554, 555
See application file for complete search history.

(56) References Cited

U.S. PATENT DOCUMENTS

| | | | |
|---|---|---|---|
| 5,160,822 A | 11/1992 | Aleshin | |
| 5,837,960 A * | 11/1998 | Lewis et al. | 219/121.63 |
| 6,122,564 A * | 9/2000 | Koch et al. | 700/123 |
| 6,154,959 A | 12/2000 | Goodwater et al. | |
| 6,172,327 B1 * | 1/2001 | Aleshin et al. | 219/121.64 |
| 6,568,077 B1 | 5/2003 | Hellemann et al. | |

FOREIGN PATENT DOCUMENTS

| | | |
|---|---|---|
| JP | 62183983 A | 8/1987 |
| JP | 2003507613 A | 2/2003 |

OTHER PUBLICATIONS

European Search Report dated Apr. 26, 2010.
State Intellectual Property Office, P.R. China, English Translation of First Office Action issued on Jun. 4, 2010, pp. 1-6.

* cited by examiner

*Primary Examiner* — Michael Wieczorek
(74) *Attorney, Agent, or Firm* — John P. Darling

(57) ABSTRACT

A method is disclosed for laser cladding a substrate, comprising providing the substrate; depositing a first determined variable bead width of a material along a toolpath upon the substrate; depositing a second adjacent determined variable bead width of a material along the toolpath which overlaps the first determined variable bead width of deposited material; continuing to deposit a plurality of overlapping predetermined adjacent variable bead widths of a material until a first material layer is complete; forming a second material layer by depositing a plurality of overlapping predetermined variable bead widths of a material on top of the first material layer; and continuing to deposit material layers on top of deposited material layers until the cladding is complete; wherein the variable bead width of the deposited material is controlled by a computer having a plurality of input parameters to maintain an approximately constant percent of bead width overlap.

8 Claims, 5 Drawing Sheets

LASER NET SHAPE MANUFACTURING USING AN ADAPTIVE TOOLPATH DEPOSITION METHOD

FIELD OF THE INVENTION

This invention relates to a manufacture and repair procedure for a part, for example a turbine component such as a bladed disk (BLISK), compressor blade, or turbine blade.

BACKGROUND OF THE INVENTION

An aircraft gas turbine engine or jet engine draws in and compresses air with an axial flow compressor, mixes the compressed air with fuel, burns the mixture, and expels the combustion gases through an axial flow turbine to power a compressor. The compressor includes a disk with blades projecting from its periphery. The disk turns rapidly on a shaft, and the curved blades draw in and compress air.

In current manufacturing practice, the compressor is made by forging the compressor disk as a single piece with slots at the periphery. The compressor blades are individually cast or forged to shape with a root section termed a dovetail that fits into slots formed in the disk. Assembly is completed by sliding the dovetail sections of the blades into the slots in the disk. If a blade does not fit properly, fails, or is damaged during service, it may be readily replaced by reversing the assembly procedure to remove the blade, and providing a new blade.

Blades may also be formed integrally with the disk, in a combination termed a bladed disk or BLISK. This combination may also be known as an integrally bladed rotor. The BLISK approach to manufacturing offers the potential for increased performance through reduced weight. Such an article can be cast or forged as a large disk with an excess of metal at the periphery. The blades are then machined from the excess metal, integrally attached to the disk. The final product is expensive to produce, as it requires extensive high-precision machining operations. An error in machining even one of the blades may result in rejection and scrapping of the entire BLISK or an expensive and time consuming repair.

Replacement or repair of a damaged blade portion of the BLISK or turbine blade presents a difficult problem with this cast and machine or forge and machine approach. If all or a portion of a blade breaks off from impact of a foreign body during operation, for example, the BLISK becomes unbalanced. Damaged BLISKS may be repaired by welding excess metal into the damaged area and machining the metal to form the appropriate shape, or by cutting out the damaged area and replacing the cut out material by diffusion bonding a new piece into the damaged area. However, such an approach is both expensive and may result in reduced performance and durability.

A different approach to manufacture and repair BLISKS has been disclosed in U.S. Pat. No. 5,038,014, incorporated herein by reference. This approach utilizes a laser cladding or welding technique that feeds powders into molten material on the surface to be repaired, which produces a layer of new material. By repeating this process in a layer-by-layer fashion, these layers are built upon one another to form new parts or to repair damaged parts.

Past laser cladding techniques have resulted in imperfections and inclusions in the formed or repaired part resulting from lack of complete fusion between successive layers or extensive porosity of the deposited layers. These imperfections and inclusions are often associated with complex geometry of the formed or repaired part. Therefore, a need exists to provide a layered fabrication technique that solves the problems associated with the past manufacture and repair techniques.

Laser Net Shape Manufacturing (LNSM) provides an economical and highly flexible method to form and restore BLISKS, compressor blades and turbine components. The LNSM technique is based on laser cladding, wherein a laser is used to create a 3D geometry by precisely cladding thin layers of metal powder on a base material.

LSNM may be used in the fabrication of new parts and the repair of damaged parts. A Computer Aided Design (CAD) model of a part to be fabricated is uniformly sliced along the desired direction of material buildup. Powder is applied and fused along a tool path to create a material layer, layers are then built upon one another until the part is fabricated. Various tool paths have been used in applying the powders, the most common being a zigzag pattern or a stitch pattern, depending on whether the material is forming an internal area or a surface area of the part. However, prior LSNM methods result in inclusions of fusion imperfections and porosity in newly fabricated or repaired parts, requiring that the part either be scrapped or further processed to repair the imperfections. In addition, past laser deposition methods for fabrication and repair have not focused on producing accurate shapes and geometries.

Therefore, a need exists to develop an accurate LNSM method that reduces fusion imperfections and porosity that allows turbine components including BLISKS, compressor blades and turbine blades to be manufactured and repaired.

SUMMARY OF THE INVENTION

In accordance with a first embodiment of the invention, a process for fabricating an article is disclosed that comprises the steps of providing a substrate, depositing a first determined variable bead width of a material along a toolpath upon the substrate, depositing a second adjacent determined variable bead width of a material along the toolpath which overlaps the first determined variable bead width of deposited material, continuing to deposit a plurality of overlapping predetermined adjacent variable bead widths of a material until a first material layer is complete; forming a second material layer by depositing a plurality of overlapping predetermined variable bead widths of a material on top of the first material layer, and continuing to deposit material layers on top of deposited material layers until the cladding is complete. The variable bead width of the deposited material is controlled by a computer having a plurality of input parameters to maintain an approximately constant percent of bead width overlap.

In accordance with a second embodiment of the invention, a laser net shape manufacturing or repair method is disclosed that comprises providing a substrate, forming by laser cladding a first determined variable bead width of a material along a toolpath upon the substrate, forming by laser cladding a second adjacent determined variable bead width of a material along the tool path which overlaps the first determined variable bead width, continuing to deposit overlapping predetermined adjacent variable bead widths of a material until a first material layer is complete, forming by laser cladding a second powder layer by depositing overlapping predetermined variable bead widths of a material on top of the first material layer, and continuing to deposit material layers on top of deposited material layers until the cladding is complete and a net shape article is manufactured or repaired. The variable bead width of the deposited material is controlled by a computer having input parameters to maintain an approximately constant percent of bead width overlap. A BLISK, compressor blade, turbine blade or turbine component may be manufactured or repaired according to this second embodiment of the invention.

According to a specific embodiment of the invention, a method of repairing a BLISK, compressor blade, turbine blade or turbine component is disclosed that comprises providing a damaged BLISK, turbine blade or turbine component and prepping the damaged BLISK, turbine blade or turbine component to form a substrate surface, depositing a first determined variable bead width of a material along a toolpath upon the substrate, depositing a second determined variable bead width of a material along a toolpath that is adjacent the deposited first determined variable bead width of a material and overlaps the first determined variable bead width of the deposited material layer, continuing to deposit adjacent overlapping predetermined variable bead widths of a material until a first material layer is complete, forming a second material layer by depositing overlapping predetermined variable bead widths of a material on top of the first material layer, and continuing to deposit material layers on top of deposited material layers until the cladding is complete. The bead width of the deposited material is controlled by a computer having input parameters to maintain an approximate constant percent of variable bead width overlap of adjacent variable bead widths of material and each deposited variable bead with is varied. A BLISK, compressor blade, turbine blade, or turbine component may be manufactured or repaired in accordance with the specific embodiment of the invention.

According to another embodiment of the invention, a method for laser cladding a substrate is disclosed that comprises providing the substrate, depositing at least one first determined variable bead width of a material along a toolpath upon the substrate to form a first material layer, forming a second material layer by depositing at least one variable bead width of a material on top of the first material layer, and continuing to deposit material layers formed by at least one variable bead width of material on top of deposited material layers until the cladding is complete.

According to yet another embodiment of the invention, a laser net shape manufacturing or repair method is disclosed that comprises providing a substrate, forming by laser cladding at least one first determined variable bead width of a powder material along a toolpath upon the substrate to form a first material layer, forming by laser cladding a second material layer by depositing overlapping predetermined variable bead widths of a powder material on top of the first powder layer, and continuing to deposit powder layers on top of deposited powder layers until the cladding is complete and a net shape article is manufactured or repaired.

Other features and advantages of the present invention will be apparent from the following more detailed description of the preferred embodiment, taken in conjunction with the accompanying drawings which illustrate, by way of example, the principles of the invention. The scope of the invention is not, however, limited to this preferred embodiment

DETAILED DESCRIPTION OF THE INVENTION

Figure 1:
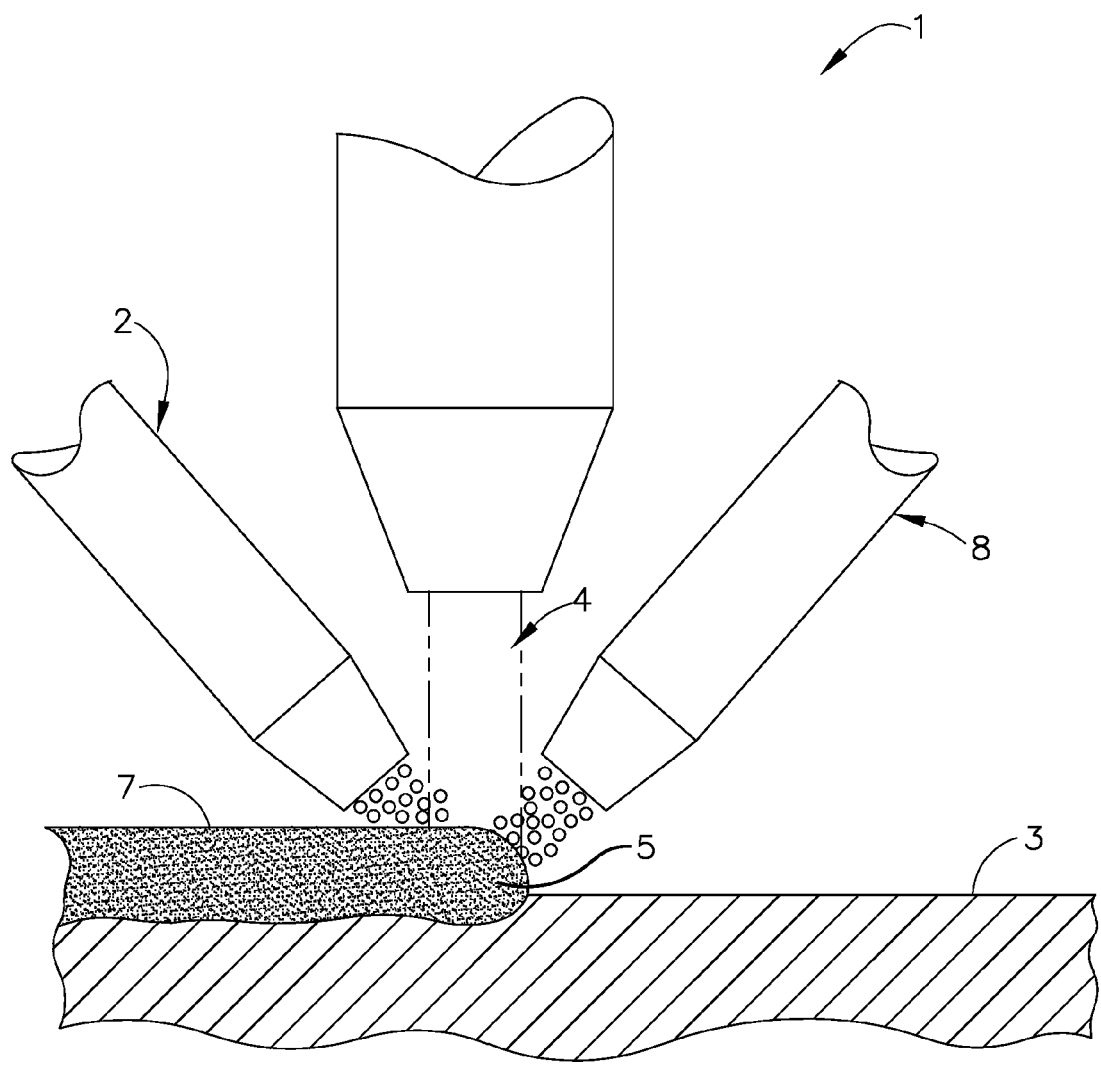
FIG. 1 is an illustration of a general LNSM deposition system.

The present invention provides a Laser Net Shape Manufacturing (LNSM) method for fabricating and repairing articles such BLISKS, compressor blades, turbine blades, and compressor components that solves the problems associated with the prior art. The LNSM technique is based on laser cladding metal powders, wherein a laser is used to create a 3D geometry by precisely cladding thin layers of powder material on a base substrate using an adaptive toolpath deposition method. The adaptive toolpath method includes providing a predetermined variable bead width within a deposited layer. The base substrate may be a BLISK surface, such as BLISK compressor disk or a BLISK blade edge. Although specific embodiments discussed below are directed to BLISKS, the invention is equally applicable to the LNSM of other parts, including a variety of turbine parts including compressor blades and turbine blades.

To form a shaped deposit by LNSM, the dimensions and overall geometry of the part or repair section are rendered in accordance with a computer-aided design (CAD) description. The geometry of the repair must be described mathematically. Modeling of the shapes is achieved through the use of a CAD system, and from these representations, toolpaths are generated to drive the LNSM process.

In order to drive the LNSM's computer numerical control (CNC) system, a toolpath file is generated from commercial computer aided manufacturing (CAM) software containing commands that are understandable to the CNC. The commands are loaded into memory and executed. Typical commands are move commands, which tell the CNC to move to a new point at a given speed, turn on/off the laser and powder flow. These commands are all embedded directly within the part program when it is created, and are triggered at specific points in the program. Some parameters that control the process must be changed dynamically during the processing of a part, including but not limited to laser power, tool velocity, powder feed rate, and overlap ratio.

Many articles may be analyzed as being an assembly of sections or slices parallel to each other. The article is then uniquely defined by specifying the pattern of each section, that is, its shape and size, and the position of each section, that is, its relationship to the adjacent sections. In such a manner, BLISK blades may be formed around the circumference of a BLISK compressor disk. The pattern of each section may be amenable to formation by a bead of deposited material, where a bead is an elongated deposit typically formed by moving the substrate relative to a heat source. Where such is the case, the article may be formed by depositing a bead of a variable width, or several side-by-side beads of variable widths in the inventive manner as set out above, in the shape of the pattern of a section, and then incrementing the deposition apparatus upwardly by the bead height, thereafter depositing another bead having the pattern of the next section and the required position in relation to the previously deposited bead. During each pass, the laser welding deposition unit melts the upper portion of the previously deposited bead, or substrate in the first pass, and adds more material through its powder feed to form the overlying bead. The newly added material and the previously deposited bead partially intermix and solidify together, ensuring a continuous, strong structure through the beads substantially free of imperfections. The process is repeated as many times as necessary to form the article.

A wide variety of shapes and sectional configurations may be made by this approach. Solid figures are made by laying down beads of variable widths above one another. Increased thickness is achieved by laying down several beads of variable widths in a side-by-side fashion in each layer in accordance with the invention as described above, and then adding more beads above that layer. Parts of varying thickness are made by changing the number of overlapping beads of variable widths in a layer. Hollow airfoil or other hollow shapes are made by depositing the bead in the shape of the outer wall, and then depositing additional overlapping beads on top of the other. Hollow sections with internal structure, such as cooling passages, are made by adding internal ribs and the like to each section, in addition to the outer walls. Virtually any shape can be defined as a collection of beads, and the present approach has the versatility to make such a wide variety of shapes. Typically, aircraft engine applications include compressor blades, turbine blades, fan blades, tubes, and boxes, with the later having square, rectangular, or irregular cross sections.

The control of the deposition is accomplished by numerically characterizing the shape of the article such as a blade from drawings or a part prepared by more conventional methods such as machining. Once the shape of the part is numerically characterized, such as by a computer aided design (CAD) solid model of the article, the movement of the part or equivalently, the deposition head, is programmed using available numerical control computer programs to create a pattern of instructions, known as transfer functions, as the movement of the part during each pass, and its lateral displacement between the passes. These developed transfer functions maintain a determined variable bead width and constant overlap of a deposited material in accordance with the invention. The resulting article reproduces the shape of the numerical characterization very accurately, to net shape or near-net shape specifications, including complex curves of an airfoil.

The LNSM method for fabricating and repairing articles in this manner melts powders by feeding the power into molten material on a surface that has been irradiated by a laser beam. The approach is controllable and yields reproducible, precise results. In fabricating an article by the present approach, the composition of the powder feed may be maintained constant throughout the entire article. Alternatively, the composition of the powder feed may be intentionally varied within any bead or as between successive beads, to produce controllable composition variations throughout the article. For example, in a compressor blade, a strong, tough alloy composition may be used near the base, and a hard, wear resistant or abrasive alloy may be used near the tip.

For the repair of articles, including BLISKs, compressor blades, turbine blades, and turbine components, it is necessary only to repeat a portion of the deposition sequence from the previously described methods. For example, if a compressor blade breaks near the midpoint, it is necessary only to grind a flat surface onto the blade corresponding to the closest remaining undamaged section, and then to repeat the computer controlled deposition of the remainder of the blade. The repaired blade is virtually indistinguishable from the original fabricated blade, as it is accomplished by the same apparatus and with the same shape-controlling pattern.

Often, damage to a BLISK, compressor blade, turbine blade, or turbine component is in the form of uneven and irregular shaped damage. In order to prepare the BLISK or turbine blade for repair, the damaged area may be prepared by machining material away in the area approximate to the damage in order to form a notch and/or to level the damaged surface. Machining away the damage is preferably conducted automatically in a multi-axis numerically controlled milling machine that is programmed to form a predetermined notch approximate to the damaged area. The repair region is then cleaned, as needed, by aqueous cleaners and/or solvents, and dried, followed by the computer controlled deposition of the remainder of the blade. The repaired portion has no macroscopically detectable bond line after finishing or discontinuity to the base portion of the blade, because the two are welded together in the same manner employed when the blade was manufactured.

A wide variety of materials may be deposited using the approach of the invention. For example, metals and metal alloys including titanium and titanium alloys, nickel and nickel alloys, cobalt and cobalt alloys, and iron and iron alloys, superalloys including Ni-based, Co-based, and Fe based superalloys, ceramics, cermets and plastics may be deposited.

The selection of the parameters that control the material deposition and bonding and how these parameters control deposition are critical to the ability of the process to repair an article to both net or near-net shape and to full density. The parameters are transformed into commands that control the LNSM deposition by transfer functions.

A Laser Net Shape Manufacturing (LNSM) system is illustrated in FIG. 1. As shown in FIG. 1, a powder supply (not shown) feeds a powder nozzle 2 for deposition upon a substrate 3. A laser 4 melts the powder as it is fed upon the substrate surface and also melts the substrate surface to create a melt pool 5 in the vicinity where the laser 4 is directed on the powder and surface of the substrate 3. The system 1 and substrate 3 are moved relatively to form a layer of a solidified deposited material 7 as the melt pool 5 cools.

The path the laser 4 takes along the substrate 3 is referred to as a toolpath. The deposited material 7 is referred to as a bead of material. The width of deposited material 7 along the toolpath is referred to as a bead width. The formed melt pool 5 cools and solidifies as the laser 4 moves along the substrate 3. More than one powder feed may be used to form the deposited material 7, and in this illustration, a second powder nozzle 8 is shown contributing to the solidified deposited material 7. The laser 4, by melting both the powder feed and the surface of the substrate 3, forms a strongly bonded deposited material 7.

Upon completion of a first bead of the deposited material 7, the nozzle 2 and laser 4 are positioned and moved relative to the substrate 3 so that an adjacent second bead of deposited material 7 may be deposited along side of the first bead, the width of the second bead overlapping the width of the first bead. The amount of overlap may be selected to be between about 10% and 90%. The process is repeated until a layer of the deposited material 7 is formed. Upon this layer, the process is repeated to build up layers of deposited material 7 until a part is formed or repaired.

In accordance with this invention, transfer functions were developed to correlate the key processing parameters including laser power, tool travel speed, powder feed rate, and defocus distance to the fundamental deposition geometry of bead width. The transfer functions have been developed to allow for an adaptive toolpath to be obtained by varying the laser power or travel speed of the laser while it is scanning along the tool path. In such a manner, a variable bead width of a material may be deposited along the toolpath. The width of the deposited bead of material may be varied during a single deposition pass and during the deposition of adjacent beads of deposited material.

The invention provides for depositing a variable bead width of a material of between about 0.2 mm and about 5.0 mm, and preferably between about 0.76 mm and about 1.52 mm, and most preferably between about 0.89 mm and about 1.42 mm. The range of variable bead width deposited within a layer depends upon deposition parameters including the deposited material composition and the geometry of the formed article.

By applying this method, a constant bead overlap ratio between adjacent beads of deposited material can be achieved that effectively eliminates fusion imperfections. The inventors have determined that a constant overlap ratio selected from about 10% to about 90% leads to improved build up performance. Furthermore, the inventors have determined that by using a variable bead width in a layer of about 0.76 mm to about 1.52 mm, improved deposition quality can be achieved that effectively eliminates gaps in the deposited material.

Adaptive bead width deposition with constant overlap ratio when applied to overhanging regions produces built up layers that are free of surface rippling. Overhanging regions are typically considered areas with a lean angle of approximately less than 35 degrees with respect to vertical. In these regions, a larger melt pool is needed to have higher powder capture efficiency, so that the deposit layer has enough material to support the next layer without slumping.

Adaptive toolpath deposition solves the prior art problems associated with depositing material upon a cold substrate. This novel method allows for the ramping down the laser power over the built up layers to ensure a constant bead width when depositing the first several layers on a cold substrate. Additionally, the power may be ramped down during the deposition of the last several layers close to the narrow tip of the blade. Particularly, an initial high laser power is selected and ramped down to a constant laser power over the first 2 to 100 deposited material layers to a determined constant laser power. This determined constant laser power is used to deposit the successive material layers until the final material layers are to be deposited. For the deposition of the final material layers, the laser power is ramped down again. Preferably, the laser is ramped down for the last 3 to 100 layers close to a narrow tip or at the surface of the newly fabricated or repaired part or blade. It should be noted that the number or layers are provided for illustrative purposes and do not represent the limits of the present invention. The range of layers over which adjustments to the laser power are made depends on the geometry of the substrate and the thermophysical properties of the substrate and powder material.

When designing the tool path for BLISK repair, the toolpath overlap ratio and overhanging angle at every interpolate point are calculated according to the part solid model. This information is then converted to laser power or speed commands at appropriate sections of tool path G-codes according to the transfer functions.

This method enables the near net shape fabrication or repair of a BLISK blades that saves material and labor for post-machining process. Because LNSM is capable of fabricating and restoring the complete blade, even more severely damaged blades can be repaired.

Figure 2:
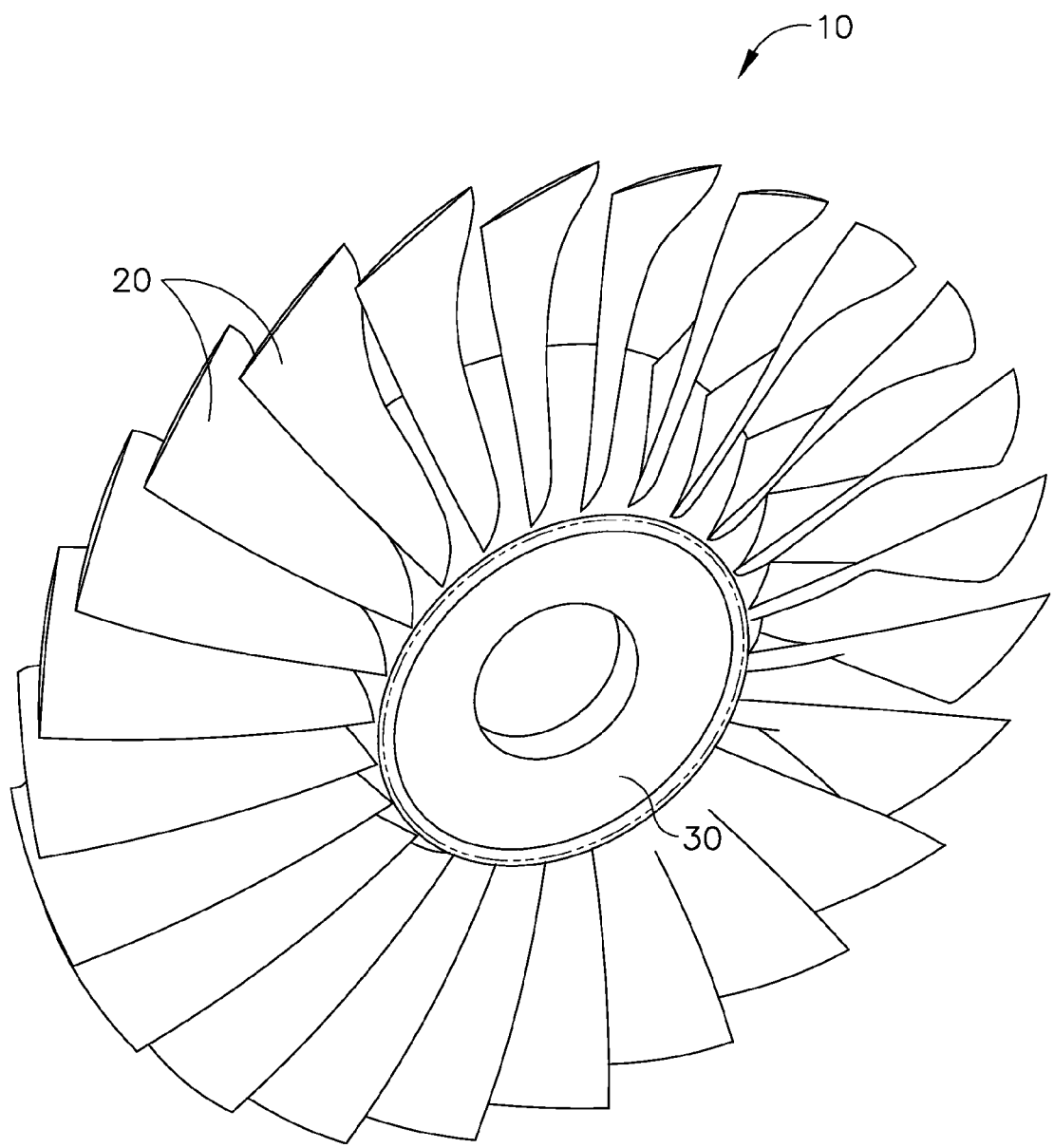
FIG. 2 is a perspective view of an exemplary BLISK.

FIG. 2 shows perspective view of a BLISK 10. The BLISK 10 is formed of BLISK blades 20 and a BLISK compressor disk 30. In a specific embodiment of the invention, the BLISK 10 may be repaired by replacing damaged material of the BLISK blades 20. Additionally, in a second specific embodiment of the invention, a BLISK may be manufactured by forming BLISK blades 20 upon the BLISK compressor disk 30.

Figure 3:
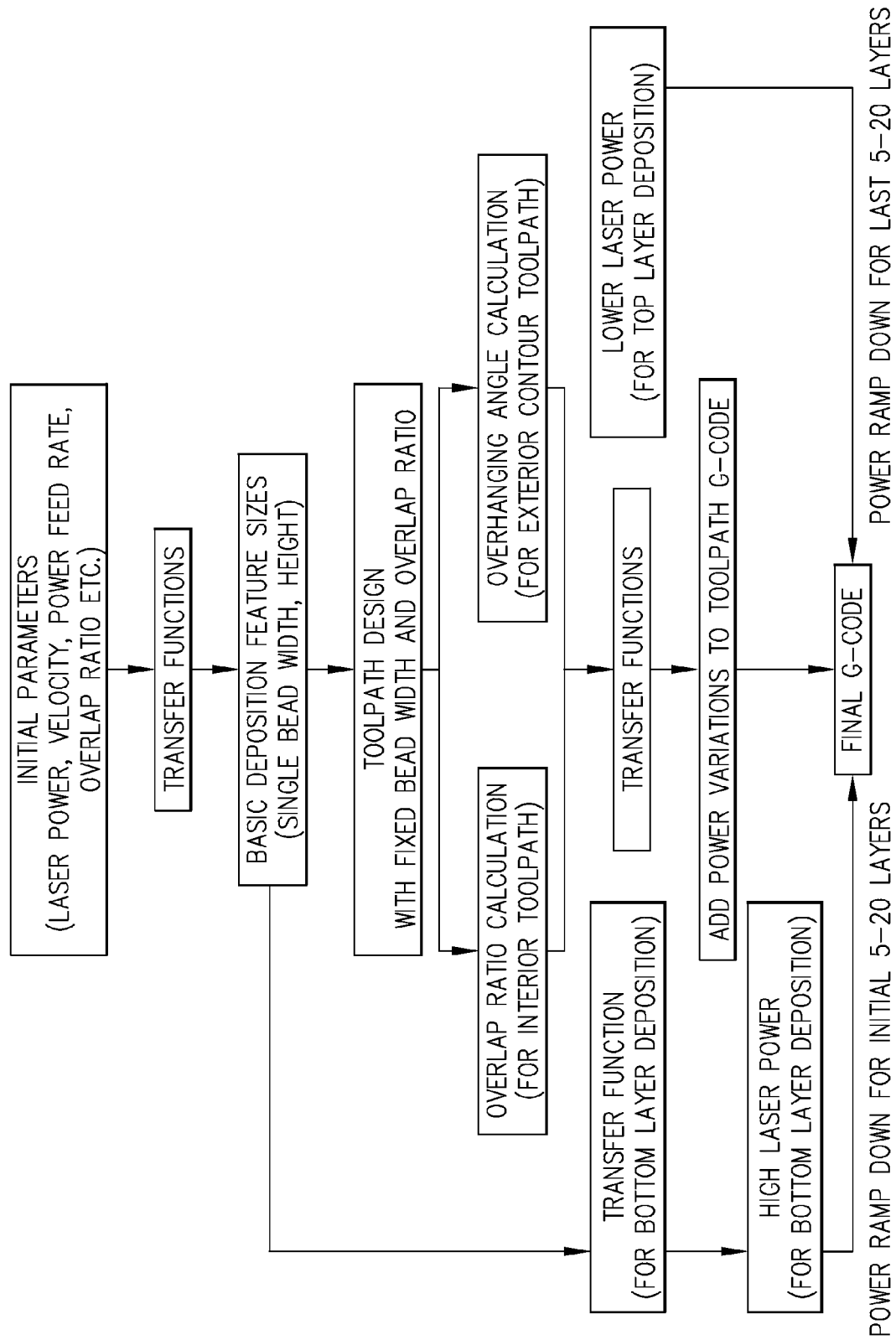
FIG. 3 is a block diagram of an embodiment of the Adaptive Tool Path Deposition Method.

FIG. 3 illustrates in block diagram form a specific embodiment of the method for repairing a BLISK. The method included determining initial process parameters that were input into a controller comprised of a digital computer that directed movement of a deposition zone along a tool path and provided control signals to adjust apparatus functions such as laser power and the speed of the laser beam, such as the speed at which a deposition head moved the laser beam and the rate at which powder was provided to the deposition zone moving along the toolpath.

As shown in FIG. 3, the initial parameters included, but were not limited to laser power, laser scanning velocity, powder feed rate, and overlap ratio. These initial parameters were provided to the controller, and the programmed transfer functions then determined the basic deposition feature of bead width and height corresponding to the desired position within the geometry of the desired formed material. The layer data were converted to tool path data in terms of computer numerical control (CNC) G-codes. These codes were then utilized to drive the fabrication tool for building up the deposited material layers.

Figure 4:
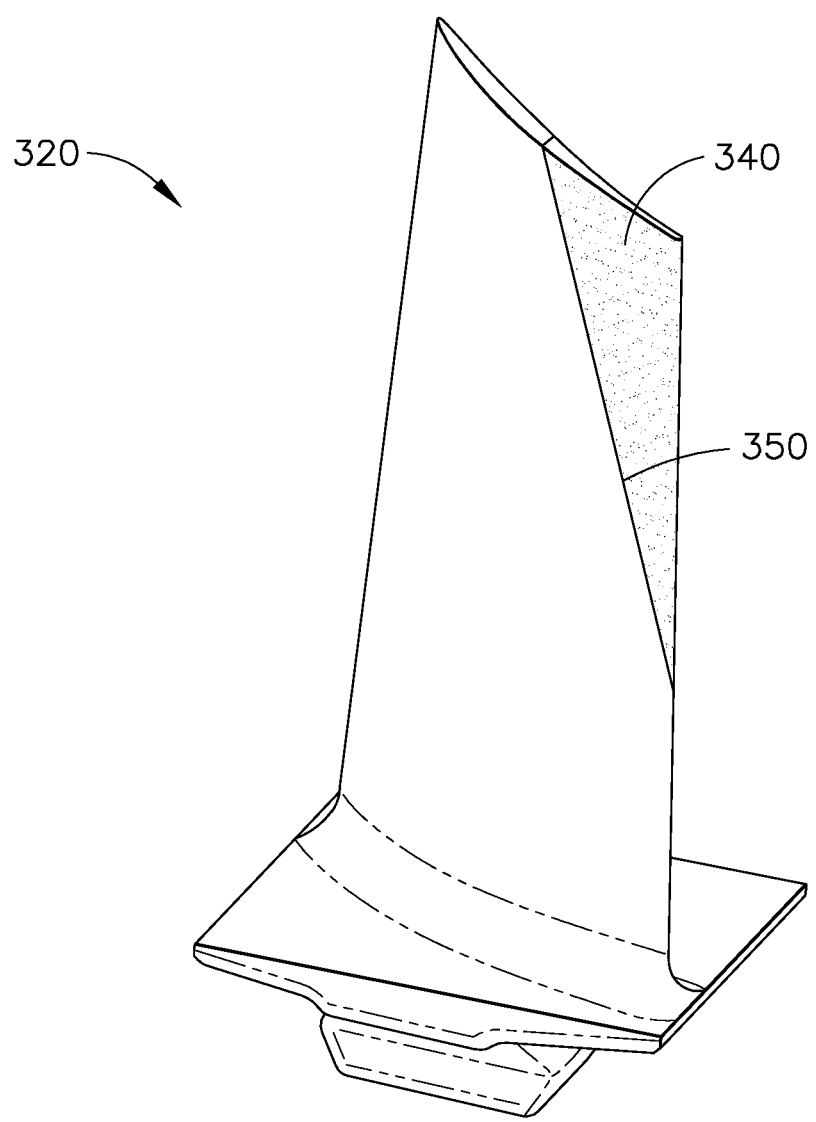
FIG. 4 is an illustration of an exemplary damaged BLISK blade.

In accordance with a specific embodiment of the invention as shown in FIG. 4, a damaged compressor blade 320 was repaired. As shown in FIG. 4, a compressor blade 320 contains damaged material 340. Damaged material 340 was removed to an approximately flat surface 350. The damaged material 340 was removed by grinding, although other methods of material removal may be used. The damaged component is shown as compressor blade 320, but it may be a damaged blade of a BLISK.

Figure 5:
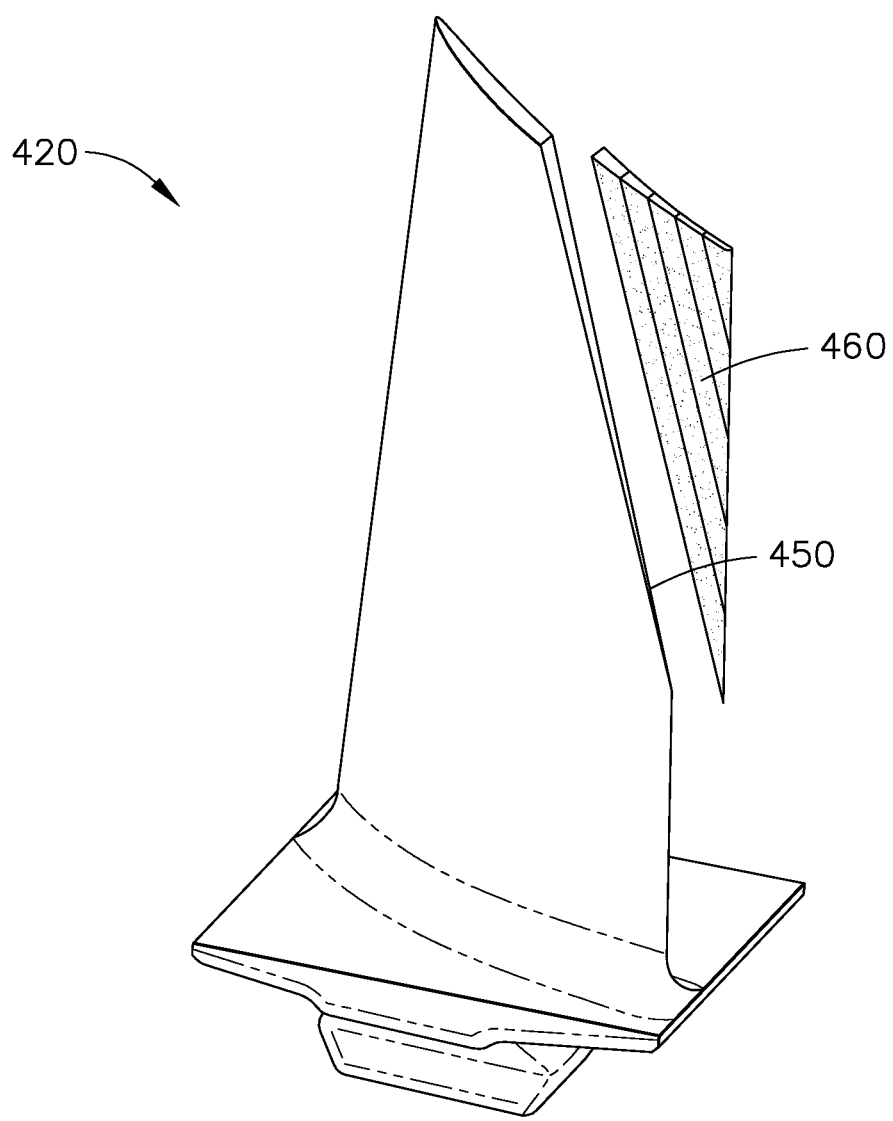
FIG. 5 is an illustration of a material build up upon an exemplary damaged BLISK blade.

As shown in FIG. 5, the compressor blade 420 had layers of material 460 built up upon the flat substrate 450 after the damaged material had been removed to repair the compressor blade 420. In this specific embodiment, the material 460 was a nickel-based superalloy Inconel 718, also known as IN718. The material 460 was deposited according to the inventive method as outlined in FIG. 2, and as further disclosed herein. The practice of the invention resulted in a repair of the compressor blade 430 to a net shape form without the need for additional machining after the repair. It should be understood that the material 460 is not limited to the specific embodiment, but may be selected from known structural materials in the field of the invention.

By depositing a variable bead width along the toolpath at a constant overlap ratio, the lack-of-fusion imperfections in the solid deposit were effectively reduced. In this specific embodiment, a variable bead width of between about 0.89 mm and about 1.42 mm and an overlap of approximately 50 percent was used to repair the compressor blade 420 and a bead deposit was formed that was substantially free of imperfections, including gap imperfections and porosity.

The power control at the overhanging regions solved the prior art surface rippling problem on the built up compressor blade surface. The surface roughness of the built up compressor blade 420 was improved by using slightly higher laser power and slower speed for the exterior contour tool path compared to the interior stitching tool path.

The current invention allowed for the ramping down of laser power over the built up layers allowing for a deposit of a variable bead width and heat dissipation rate in the built up material of the compressor blade 420. This reduced problems such as lack of fusion at the initial layers when depositing on the cold surface 450. Additionally, by adaptively ramping down the laser power over the layers as approaching the narrow tip of the compressor blade 420, thicker bead width and surface oxidation due to overheating was minimized.

In addition, a single variable bead width of deposited material may form a layer. In such a manner, layers formed of a single variable bead width of deposited material may be deposited upon layers formed of multiple adjacent beads of material. Furthermore, a part may be fabricated by forming layers of single bead widths upon layers formed of a single bead width of a deposited material to form or repair a part.

In accordance with a second specific embodiment of the invention, a BLISK 10 as shown in FIG. 2 was manufactured. According to this embodiment, a BLISK compressor disk 30 was formed by the conventional fabrication method of casting, although the disks may be formed by other methods such as forging or machining. An outer surface of the BLISK compressor disk 30 provided the substrate for the BLISK blades 20 to be formed thereupon.

A BLISK blade material, in this case a nickel-based superalloy Inconel 718, also known as IN718, was used to form BLISK blades 20 upon the BLISK compressor disk 30. The IN718 material was deposited according to the inventive method as outlined in FIG. 2, and as further disclosed herein. The practice of the invention resulted in fabrication of the BLISK blades 20 to a net shape form without the need for additional machining after the fabrication.

By depositing a variable bead width along the toolpath at a constant overlap ratio, the lack-of-fusion imperfections in the solid deposit were effectively reduced. In this specific embodiment, a variable bead width in a layer of between about 0.89 mm to about 1.42 mm and an overlap of approximately 50 percent were used to fabricate BLISK blades 20 that were substantially free of imperfections, including gap imperfections.

The power control at the overhanging regions solved the prior art surface rippling problem on the build up BLISK blades 20 surface. The surface roughness of the built up BLISK blades 20 was improved by using slightly higher laser power and slower speed for the exterior contour tool path compared to the interior stitching tool path.

The current invention allowed for the ramping down of laser power over the built up layers allowing for a deposit of a variable bead width and heat dissipation rate in the built up part. This reduced problems such as lack of fusion imperfections at the initial layers when depositing on the cold substrate of the surface of the BLISK compressor disk 30. Additionally, by adaptively ramping down the laser power over the layers as approaching the narrow tip of the BLISK blades 20, surface oxidation due to overheating was minimized.

The performance of the BLISK is not reduced as a result of a repair according to the invention. This approach allows the blades of the BLISK to be repaired multiple times, without loss of the functionality of the BLISK due to an excessive reduction in its dimensions in the non-repaired regions to below the minimum specified values.

This method can be applied to new part buildup as well as repair. In new part buildup, the initial layers are deposited upon a sacrificial substrate, or, as when forming a BLISK, material buildup may be performed on an integrated section of the part such as the BLISK compressor disk. The adaptive control of the toolpath for the initial layers, overhanging regions and edge regions is the same as in the repair application.

The disclosed invention presents many advantages over the prior art method of layered deposition. First, by depositing a variable bead width along the tool path at a constant overlap ratio, the number of lack of fusion imperfections in the solid deposit can be reduced. Second, the power control at the overhanging regions can solve the surface rippling problem on the build up blade surface by more effective control of heating at these regions. Third, the use of a higher laser power and slower speed for the exterior contour tool path compared with the interior stitching tool path improves the surface roughness of the deposited material. Fourth, by ramping down the laser power over the built up layers, a constant bead width and heat dissipation rate can be maintained in the built up part. Problems such as lack of fusion and porosity at the initial few layers when depositing on a "cold" substrate and surface oxidation due to overheating when depositing close to the narrow blade tip are solved by adaptively ramping down the laser powder over the deposited layers.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for laser cladding a substrate, comprising:
providing the substrate;
inputting transfer functions into a computer to control parameters comprising laser power, laser velocity, defocus distance and powder feed rate to obtain an approximate constant variable bead width of deposited material and overlap ratio;
depositing a first determined variable bead width of a material along a toolpath upon the substrate;
depositing a second adjacent determined variable bead width of a material along the toolpath which overlaps the first determined variable bead width of deposited material, wherein the step of depositing the second adjacent determined variable bead width includes varying the laser power to provide varying of the second adjacent determined variable bead width along the tool path such that an overlap between the first determined variable bead width and the second adjacent determined variable bead width is held approximately constant;
continuing to deposit a plurality of overlapping predetermined adjacent variable bead widths of a material until a first material layer is complete;
forming a second material layer by depositing a plurality of overlapping predetermined variable bead widths of a material on top of the first material layer; and
continuing to deposit material layers on top of deposited material layers until the cladding is complete;
wherein the variable bead width of the deposited material is controlled by the computer having a plurality of input parameters to maintain the approximately constant percent of bead width overlap; and
wherein the laser power is initially a higher laser power for a first 2 to 100 deposited powder layers, then ramped down over the course of depositing the remaining powder layers.

2. The method of claim 1, wherein each deposited variable bead width of a material in a layer is varied between about 0.2 mm and about 5.0 mm.

3. The method of claim 1, wherein the overlap is maintained between about 10% to about 90%.

4. A laser net shape manufacturing or repair method, comprising:
providing a substrate;
inputting transfer functions into a computer to control parameters comprising laser power, laser velocity, defocus distance and powder feed rate to obtain an approximate constant variable bead width of deposited material and overlap ratio;

forming by laser cladding a first determined variable bead width of a material along a toolpath upon the substrate;

forming by laser cladding a second adjacent determined variable bead width of a material along the tool path which overlaps the first determined variable bead width, wherein the step of forming the second adjacent determined variable bead width includes varying the laser power to provide varying of the second adjacent determined variable bead width along the tool path such that an overlap between the first determined variable bead width and the second adjacent determined variable bead width is held approximately constant;

continuing to deposit overlapping predetermined adjacent variable bead widths of a material until a first powder layer is complete;

forming by laser cladding a second powder layer by depositing overlapping predetermined variable bead widths of a material on top of the first powder layer; and continuing to deposit powder layers on top of deposited material layers until the cladding is complete and a net shape article is manufactured or repaired;

wherein the variable bead width of the deposited material is controlled by the computer having input parameters to maintain an approximately constant percent of bead width overlap; and wherein the laser power is initially a higher laser power for a first 2 to 100 deposited powder layers, then ramped down over the course of depositing the remaining powder layers.

5. The laser net shape manufacturing method of claim 4, wherein each formed variable bead with is varied between about 0.2 mm and about 5.0 mm in a layer.

6. The laser net shape manufacturing method of claim 4, wherein the overlap is between about 10% to about 90%.

7. A method of repairing a BLISK, compressor blade, turbine blade or turbine component, comprising:

providing a damaged BLISK, compressor blade, turbine blade or turbine component;

prepping the damaged BLISK, compressor blade, turbine blade or turbine component to form a substrate surface;

inputting transfer functions into a computer to control parameters comprising laser power, laser velocity, defocus distance and powder feed rate to obtain an approximate constant variable bead width of deposited material and overlap ratio;

depositing a first determined variable bead width of a material along a toolpath upon the substrate surface;

depositing a second determined variable bead width of a material along a toolpath that is adjacent the deposited first determined variable bead width of a material and overlaps the first determined variable bead width of the deposited material layer, wherein the step of depositing the second determined variable bead width includes varying the laser power to provide varying of the second determined variable bead width along the tool path such that an overlap between the first determined variable bead width and the second determined variable bead width is held approximately constant;

continuing to deposit adjacent overlapping predetermined variable bead widths of a material until a first material layer is complete;

forming a second material layer by depositing overlapping predetermined variable bead widths of a material on top of the first material layer; and continuing to deposit material layers on top of deposited material layers until the cladding is complete;

wherein the bead width of the deposited material is controlled by the computer having input parameters to maintain an approximate constant percent of variable bead width overlap of adjacent variable bead widths of material;

wherein each deposited variable bead with is varied between about 0.2 mm and about 5.0 mm in a layer; and wherein the laser power is initially a higher laser power for a first 2 to 100 deposited powder layers, then ramped down over the course of depositing the remaining powder layers.

8. The method of repairing the BLISK, compressor blade, turbine blade or turbine component of claim 7, wherein the overlap is between about 10% and about 90%.

* * * * *